Patented Dec. 10, 1929

1,738,971

UNITED STATES PATENT OFFICE

HENRY HERMAN STORCH, OF NEW YORK, N. Y., ASSIGNOR TO THE ROESSLER & HASSLACHER CHEMICAL COMPANY, OF NEW YORK, N. Y., A CORPORATION OF NEW YORK

PROCESS AND CATALYST FOR SYNTHESIS OF METHANOL

No Drawing.   Application filed August 2, 1927. Serial No. 210,215.

This invention relates to the synthesis of methanol from hydrogen and carbon monoxide and specifically has for its object the preparation and use of a catalyst comprising copper, magnesia and silica for the synthesis of methanol from a mixture of hydrogen and carbon-monoxide. In this reaction the gases combine chiefly in accordance with the following equation: $2H_2 + CO = CH_3OH$.

I have found that a catalyst mass comprising copper, magnesia and silica gives surprisingly better results, than either of these materials alone, or the copper and magnesia.

I prepare this catalyst as follows:

284 parts by weight of sodium silicate ($Na_2SiO_3.9H_2O$) in 1000 parts by weight of water was mixed with a solution containing 256 parts of magnesium nitrate

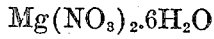

in 1000 parts of water. A solution containing 120 parts of copper nitrate

in 500 parts of water was now thoroughly mixed into the first solution, and then a solution containing 40 parts by weight of sodium hydroxide in 500 parts of water was stirred in, and the whole heated to boiling. The precipitate which formed was then filtered out on the suction filter and washed until tests showed it to be free from nitrates; the cake was then dried at about 150–200° C. and crushed to granules of about 10–30 mesh. After drying the empirical composition of the catalyst was about 28.3% CuO, 28.8% MgO and 42.9% $SiO_2$.

The mixture was now treated with a reducing gas such as will be described below. After this reducing treatment the empirical composition of the catalyst was about 24% Cu, 30.5% MgO, and 45.5% $SiO_2$. The reducing treatment can be carried out by passing reducing gases such as hydrogen, or mixtures of hydrogen with carbon monoxide or methanol or both over the heated mass. I prefer to reduce with hydrogen saturated at room temperature with methanol. In order to prevent large uncontrollable increases in temperature during reduction it is usually desirable to dilute the reducing gas with nitrogen or other inert gas. For example, a satisfactory mixture would be 3 volumes hydrogen, 2 volumes methanol vapor and 95 volumes nitrogen. This reducing mixture is passed at atmospheric pressure over the dried precipitate preferably contained in a copper lined vessel and heated to not over 350° C. and preferably to about 150–200° C. The reduction is complete when no further condensation of water is observed upon cooling the off-gases. A rough index of the progress of the reduction may be obtained by plotting the temperature of the catalyst against time. After the maximum temperature has been passed a further reduction period of about an hour generally suffices to complete the reduction. All of the CuO is reduced to the metallic copper, the MgO and $SiO_2$ being probably unaffected.

After reduction the granules were dark copper colored, and of a hard, firm, though brittle structure suited for any methanol synthesis system. In this final form the catalyst is probably of a complex structure, as yet unknown, but which I formulate as

and call copper, magnesia and silica although I do not wish to be limited to this formula as the catalyst may be of different structure.

However, this catalyst is not to be confused with one prepared by depositing copper on asbestos as a support. Asbestos, while containing magnesium and silicon, is a more or less definite natural compound quite different from my catalytic magnesia-silica prepared by coprecipitation from soluble salt of magnesium and silicon in conjunction with copper. My copper-magnesia-silica definition is accordingly to be applied only to my coprecipitated product, as herein described, and asbestos is disclaimed from this definition. This, however, does not preclude my depositing my copper-magnesia-silica catalyst on asbestos or any other carrier.

In employing the catalyst for methanol synthesis from hydrogen and carbon monoxide it is desirable to use gases substantially free from the common catalyst poisons which may be present in the raw materials, such as, for example, arsenic, sulphur, phosphorous, volatile iron compounds, or other deleterious constituents gathered during the gas production.

The granular catalyst material which has been treated by reducing gases as described above was packed in a copper lined high pressure steel bomb and the whole heated to about 270° C. A gas mixture, comprising essentially 4 volumes hydrogen and one volume carbon monoxide, and essentially free of catalyst poisons was now passed through the heated catalyst under a pressure of about 200 atmospheres and at a space velocity per hour (S. V. H.) equivalent to about 8100 cubic feet of gas per cubic foot of catalyst per hour, calculated at normal temperature and pressure, (N. T. P. 0° C. and 1 atmosphere). During this reaction the temperature of the catalyst mass was about 270–335° C. A sustained yield of methanol was obtained equivalent to a space time yield (S. T. Y.) of 2530 pounds of methanol per cubic foot of catalyst per 24 hours. The products formed were recovered from the off-gases by cooling while still under pressure. The product was about 95% methanol. The catalyst retained its granular form after use in the above manner for extended periods of time. The catalyst temperature at the gas inlet was about 270–300° C. and at the exit was about 335° C.; the outer shell of the bomb containing the catalyst was maintained at a temperature of about 270° C.

The copper, magnesia and silica catalyst as prepared above was also utilized in a low pressure experiment. In this case the pressure was 67 atmospheres, the gas mixture 4 volumes of hydrogen to 1 of CO, catalyst temperature 270 to 300° C. S. V. H. 8000. Under the above conditions an S. T. Y. of 670 was obtained.

A highly suitable method of utilizing my catalyst is to prepare it in the form of pills. For this purpose I prefer to pulverize the dried material before reduction and then compress this powder into small compact masses of desired form, such as, for example, pills. I have obtained excellent results with pills about one-fourth inch in diameter and about one-eighth inch thick. After compression into pills the catalyst is reduced as before and is then ready for use. The pills are packed into the catalyst bomb as in the case of the granular catalyst.

I have found in the course of many experiments with this catalyst that the exact quantities, proportions, etc. given in the preferred examples of catalyst manufacture may be varied, and my catalyst can still be obtained, and I therefore do not wish to be definitely restricted to the examples given. I have found in general that these catalyst materials are valuable with proportions of copper running up to 50% by weight of the finely reduced catalyst mass. If the per cent of metallic reduced copper is above this amount, I have found that the catalysts sinter very easily and lose their effectiveness as methanol catalysts. I therefore, prefer to maintain a percentage of copper below 50% by weight. If the percentage of copper is less than 5 or 10% by weight of the catalyst mass, I have found that the rate of conversion is not satisfactory. I therefore, prefer to have at least 5% and preferably over 10% of the catalyst mass as metallic copper. I have found that in general approximately 25–30% by weight of metallic copper gives the best results. It is to be noted from the percentages compositions given above as well as from the amounts of material utilized in forming this catalyst that the MgO and $SiO_2$ are present in equimolecular amounts. Therefore, with the limitations as given in the case of copper above the MgO and $SiO_2$ form the balance of the catalyst preferably in the proportions noted.

Nor do I wish to be limited in the utilization of this catalyst to the preferred example of methanol manufacture which I have given by way of illustration. This catalyst is of high activity and hence will operate over a large range of varying conditions, all combinations of which need not be given. I have used this catalyst under many conditions and find that wide limits of pressure and temperature are permissible. All the factors such as, temperature, S. V. H., pressure, etc. may be varied in order to secure various S. T. Y's or per cent conversions which may be desired because of mechanical and thermal control or for manufacturing economies.

This catalyst has also given good results with gas mixtures where the ratio of hydrogen to carbon monoxide was less as well as greater than that given in my preferred example. My catalyst will form methanol from a gas mixture having any ratio of hydrogen to carbon monoxide, but if the ratio is below one to one by volume the S. T. Y. will be considerably lower than that obtained with hydrogen in excess by volume. In general, I prefer not to use less hydrogen than that required theoretically by the equation $2H_2 + CO = CH_3OH$. I have found that a gas containing about four volumes of hydrogen to each volume of carbon monoxide gives the best results, and that with about 6 volumes of hydrogen the S. T. Y. is somewhat lower. For economic reasons I, therefore, prefer not to exceed 6 volumes of hydrogen for each volume of carbon monoxide, but I do not wish to be limited to this amount since methanol will be formed with the higher hydrogen ratios.

This catalyst is suited for the above syntheses at temperatures ranging between 150° C. and 450° C. although I have found the best results are secured between 300° C. and 400° C. Within the temperature limits given above, methanol will be formed in substantial amounts by this catalyst at pressures of 5 atmospheres and upwards, dependent on the temperature used. Substantial yields of methanol may even be obtained at pressures lower than this; for example, at one atmosphere. Under such conditions, however, the S. T. Y. is in general so much lower that the process would not be economical. In general, I have found that the best results are secured between 200 and 300 atmospheres, but I do not wish to be limited to this range. The catalyst will form methanol under the pressure and temperature limits given above at any space velocity. Because of economic reasons, however, I prefer space velocities of 2000 to 20,000 calculated at N. T. P.

Claims:

1. A catalyst for the production of methanol from hydrogen and carbon monoxide which comprises copper, magnesia and silica.

2. A catalyst for the production of methanol from hydrogen and carbon monoxide which comprises reduced copper, magnesia and silica.

3. A catalyst for the production of methanol from hydrogen and carbon monoxide which comprises up to 50% by weight of reduced copper and the balance magnesia and silica.

4. A catalyst for the production of methanol from hydrogen and carbon monoxide which comprises up to 50% by weight of reduced copper and the balance magnesia and silica in equimolecular proportions.

5. Process for the production of methanol which comprises passing a gaseous mixture of hydrogen and carbon monoxide in contact with a hot catalyst mass comprising copper, magnesia and silica.

6. Process for the production of methanol which comprises passing a gaseous mixture of hydrogen and carbon monoxide, containing an excess of hydrogen, at a pressure above atmospheric in contact with a hot catalyst mass comprising up to 50% by weight of reduced copper and the balance magnesia and silica in equimolecular proportions.

7. Process for the production of methanol which comprises passing a gaseous mixture of hydrogen and carbon monoxide containing an excess of hydrogen at a pressure of between 5 and 300 atmospheres in contact with a hot catalyst mass comprising copper, magnesia and silica.

8. Process for the production of methanol which comprises passing a gaseous mixture of hydrogen and carbon monoxide containing an excess of hydrogen at a pressure above atmospheric in contact with a catalyst mass comprising copper, magnesia and silica, said catalyst being maintained at a temperature of between 150° C. and 450° C.

9. Process for the production of methanol which comprises passing a gaseous mixture of hydrogen and carbon monoxide containing an excess of hydrogen at a pressure above atmospheric in contact with a catalyst mass comprising up to 50% by weight of reduced copper and the balance magnesia and silica in equimolecular proportions, said catalyst being maintained at a temperature of between 150° C. and 450° C.

10. Process for the production of methanol which comprises passing a gaseous mixture of hydrogen and carbon monoxide, containing an excess of hydrogen at a pressure of between 5 and 300 atmospheres in contact with a catalyst mass comprising copper, magnesia and silica, said catalyst being maintained at a temperature of between 150° C. and 450° C.

11. Process for the production of methanol which comprises passing a gaseous mixture of hydrogen and carbon monoxide containing an excess of hydrogen at a pressure of between 5 and 300 atmospheres in contact with a catalyst mass comprising copper, magnesia and silica, said catalyst being maintained at a temperature of between 300 and 400° C.

12. Process for the production of methanol which comprises passing a gaseous mixture of essentially four volumes of hydrogen and one volume of carbon monoxide, at a pressure of between 5 and 300 atmospheres in contact with a catalyst mass comprising up to 50% by weight of reduced copper and the balance magnesia and silica, said catalyst being maintained at a temperature of between 300 and 400° C.

13. Process for the production of methanol which comprises passing a gaseous mixture of essentially four volumes of hydrogen and one volume of carbon monoxide, at a pressure of between 5 and 300 atmospheres in contact with a catalyst mass comprising up to 50% by weight of reduced copper and the balance magnesia and silica in equimolecular proportions, said catalyst being maintained at a temperature of between 300 and 400° C.

Signed at Perth Amboy in the county of Middlesex and State of New Jersey this 25th day of July, A. D. 1927.

HENRY HERMAN STORCH.